United States Patent [19]
Arai

[11] Patent Number: 4,888,752
[45] Date of Patent: Dec. 19, 1989

[54] FOCUSING AND TRACKING SERVO SYSTEM FOR CONTROLLING THE PROJECTION OF AN OPTICAL BEAM ON AN OPTICAL DISK

[75] Inventor: Shigeru Arai, Zushi, Japan

[73] Assignee: Fujitsu Limited, Kawasaki, Japan

[21] Appl. No.: 225,610

[22] Filed: Jul. 28, 1988

Related U.S. Application Data

[63] Continuation of Ser. No. 824,276, Jan. 30, 1986, abandoned.

[30] Foreign Application Priority Data

Jan. 31, 1985 [JP] Japan ................... 60-018035

[51] Int. Cl.$^4$ .............................................. G11B 7/00
[52] U.S. Cl. ..................................... 369/44; 369/45; 369/46; 250/201
[58] Field of Search .................................... 369/43–47; 250/201; 358/342

[56] References Cited

U.S. PATENT DOCUMENTS

| | | | |
|---|---|---|---|
| 4,455,085 | 6/1984 | Kato et al. | 250/201 DF |
| 4,492,856 | 1/1985 | Kimura | 250/201 DF |

FOREIGN PATENT DOCUMENTS

| | | | |
|---|---|---|---|
| 2489574 | 5/1982 | France | |
| 58-3140 | 8/1983 | Japan | |

OTHER PUBLICATIONS

Patent Abstracts of Japan, vol. 9, No. 308, Dec. 4, 1985 & JP-A-60 138748.
Patent Abstracts of Japan, vol. 7, No. 73, Mar. 25, 1983 & JP-A-58 3140.
Patent Abstracts of Japan, vol. 9, No. 221, Sept. 7, 1985 & JP-A-60 79537.
Patent Abstracts of Japan, vol. 8, No. 179, Aug. 17, 1984 & JP-A-59 71135.

*Primary Examiner*—Robert L. Richardson
*Attorney, Agent, or Firm*—Staas & Halsey

[57] ABSTRACT

A focusing and tracking servo system for generating focusing and tracking error signals for use in driving a servo system which focuses and tracks an optical beam, such as a laser beam on an optical disk. The system includes a photosensor having two sub-photosensors arranged to be adjacent to each other and to have a common boundary, and the laser beam has a circular cross-section and an optical axis. The laser beam reflected by the optical disk is incident on the photosensor so that the optical axis is offset from the boundary between the sub-photosensors. Consequently, the optical spot formed on each sub-photosensor has a different area and the sub-photosensors generate different photoelectric currents. The output currents from the sub-photosensors are individually amplified by amplifiers having adjustable amplification factors, and the amplification factors are set so that they are inversely proportional to the output current of the sub-photosensors when the laser beam incident on the optical disk is in an in-focus state. When the laser beam incident on the optical disk is in an out-of-focus state the optical spot changes, and thus the relative output currents of the sub-photosensors change. A focusing error signal is generated in accordance with the difference of the output currents of the amplifiers. In another embodiment of the present invention a photosensor array having four sub-photosensors arranged in a quadrant matrix with two boundaries is utilized to generate both focusing and tracking error signals.

11 Claims, 7 Drawing Sheets

FOCUSING AND TRACKING SERVO SYSTEM FOR CONTROLLING THE PROJECTION OF AN OPTICAL BEAM ON AN OPTICAL DISK

This is a continuation of co-pending application Ser. No. 824,276 filed on Jan. 30, 1986 now abandoned.

BACKGROUND OF THE INVENTION

1. Field of the Invention

The present invention relates to a focusing and tracking system for an optical storage apparatus which stores information on the surface of an optical disk in the form of a large number of pits aligned in tracks and, more particularly, to a servo system for focusing and tracking an optical beam, such as a laser beam, on the surface of the optical disk for reading information stored on the disk by processing the optical beam after it is reflected by the disk.

2. Description of the Related Art

Optical storage devices generally store binary signal information in the form of a large number of pits formed on the surface of an optical disk. The information is readable by scanning the pits, which are aligned in circular tracks or on a spiral track, with an optical beam (hereinafter a laser beam). The laser beam is focused to form a small spot having a diameter of approximately 1 μm on the surface of the disk and guided to follow the tracks on the disk. Information is read from the disk by detecting the laser beam reflected by the surface of the disk and modulated by the pits formed thereon. Modulations of the laser beam include, for example, diffraction modulation, absorption modulation, and reflection modulation, depending on the type of optical storage apparatus.

The pitch of the tracks is small, typically 1.6 μm, and the size of the pits aligned on the tracks is on the order of 0.8 to 1.0 μm. Thus, an optical storage medium achieves an extraordinarily high signal density in comparison with the signal density of a magnetic storage medium. In order to accurately read information from an optical disk, a highly accurate servo system is necessary to center the laser beam on the tracks. The tracks, however, may be eccentric, due to insufficient dimensional preciseness of the disk, having positional variations on the order of 100 μm. This results in cyclic variations of the positions of the tracks in the radial direction when the disk is rotated, causing difficulties in achieving accurate tracking. In addition, there are difficulties in focusing the optical beam, since an objective lens with a high numerical aperture, such as 0.5, is used in the optical storage apparatus in order to permit the reading of extremely fine details, resulting in a very small depth of field, on the order of several μm. Further, the disk surface may have variations in the vertical direction on the order of 100 μm due to distortions of the disk.

In spite of the above-mentioned conditions, the laser beam must be centered on a track with an accuracy of approximately 0.1 μm to avoid cross-talk, and the laser beam must be focused on the surface with an accuracy of approximately 0.5 μm. Thus, an accurate servo system for centering and focusing the laser beam on the tracks of the optical disk is a key feature of an optical storage apparatus. Various servo systems for focusing and tracking an optical beam have been developed and are reported in references such as "Optical Read Out of Video Disks," by C. Bricot et al., IEEE Transactions C.E., Nov., 1976, p. 304.

In most focusing servo systems, an objective lens for focusing an optical beam is moved by an electrodynamic coil similar to those utilized in acoustic loud speakers. The signals for driving the electrodynamic coil, namely error signals, may be obtained by using optical sensors which detect the laser beam reflected form the information carrying surface. Typical optical systems used in practice are astigmatic and asymmetric systems.

In an astigmatic sensor, error signals are derived by an optical system having a cylindrical lens placed in the path of the reflected laser beam and four photosensors connected in pairs to differential amplifiers. With such an astigmatic system, the number of optical elements in a system is rather large and the system is costly.

In an asymmetric sensor, a mask edge is placed in the path of the reflected laser beam to shade part of the laser beam, and two photosensors connected to a differential amplifier provide error signals. The asymmetric sensor, therefore, is less complicated than an astigmatic sensor. Both astigmatic and asymmetric systems, however, include optical elements which must be assembled with an extremely high degree of dimensional accuracy in the direction parallel to the surface of the disk as well as the direction perpendicular to the disk, namely, in three dimensions, adversely affecting the cost and quality of the apparatus.

For radial tracking servo systems, there are several methods for generating error signals, the particular method being selected in accordance with the type of modulation of the reflected laser beam. Typically, radial tracking is accomplished by reflecting the laser beam using a tilting mirror which is driven by an electrodynamic activator in accordance with tracking error signals. One example of a conventional system for obtaining an error signal will be described for use with optical disks designed for diffraction modulation, namely, disks having pregrooves. In this method, a single laser beam is used to obtain error signals for driving a tilting mirror. When the laser spot is not well centered on the track, the reflected beam has a asymmetrical intensity pattern. The intensity pattern is detected by two photosensors connected to a differential amplifier. This method is referred to as a "push-pull" method; however, this method is not applicable to flat optical disks, i.e., disks which do not have pregrooves.

For optical disks having a flat surface and providing reflection modulation, a tracking servo system detects an asymmetric distribution which occurs when the beam is not well centered on the track, with two or more photosensors.

Simplification of the tracking servo system is necessary to improve the performance, quality and reliability of optical storage apparatus. Furthermore, there are problems inherent to optical systems which provide disturbances caused by small but inevitable optical defects, referred to as "exterior disturbances".

SUMMARY OF THE INVENTION

It is an object of the present invention to provide a focusing and tracking servo system for an optical storage apparatus with a simple and easily adjustable optical system for generating focus error signals.

It is another object of the present invention to provide a focusing and tracking servo system for an optical storage apparatus having a simple and easily adjustable optical system which simultaneously generates focus error signals, tracking error signals, and read signals.

It is a further object of the present invention to provide a low cost and reliable focusing and tracking servo system for an optical storage apparatus.

The present invention relates to a simple and easily adjustable optical system for generating focusing and tracking error signals for use in driving a servo system which focuses and tracks an optical beam, usually a laser beam, on an optical disk. The optical system is an essentially asymmetric system, a first embodiment of which includes a photosensor having two sub-photosensors arranged to be adjacent to each other and to have a common boundary. The laser beam has a circular cross-section, and thus the optical spot formed on the photosensor by the laser beam is circular. One feature of the present invention is the displacement by a predetermined distance of the center of the optical spot from the boundary between the sub-photosensors. Consequently, the optical spot formed on each sub-photosensor has a different area, resulting in the generation of different photoelectric currents by the sub-photosensor. The output currents from the sub-photosensors are individually amplified by amplifiers having adjustable amplification factors, the amplification factor being inversely proportional to the output current of the sub-photosensors when the laser beam incident on the optical disk is in an "in focus" state. As a result, the output current of the amplifiers is the same when the laser beam is in the "in focus" state. A focus error signal is generated in accordance with the difference of the output currents of the amplifiers, and thus the focus error signal for the "in focus" state is zero.

The optical spot of the laser beam projected on the sub-photosensor has a fixed area for the "in focus" state. Thus, when the area of the optical spot projected on the sub-photosensors is reduced or enlarged, the laser beam is in an "out of focus" state. In the "out of focus" state, the optical spot maintains its circular shape and the position of the center of the optical spot maintains its predetermined displacement from the boundary between the sub-photosensors, and accordingly, the output of the sub-photosensors is unbalanced, and the output currents of the amplifiers are different. A differential amplifier compares the outputs of the amplifiers and generates an error signal.

The optical system for generating focus error signals in accordance with the present invention has many advantages. In particular, the number of optical elements in the optical system is small in comparison with the number of elements in prior art optical systems, especially with respect to astigmatic sensors. Further, the adjustment of the optical system is simplified; the relative position of the laser beam and the photosensor, i.e., the boundary between the two sub-photosensors, may be set with a fairly high degree of tolerance, and it is relatively simple to adjust the amplification factors of the relevant amplifiers so that the output currents of the amplifiers are equal for the "in-focus" state.

Moreover, "exterior disturbances" caused by diffraction of the laser beam incident on pre-grooves or pits formed on the disk, can be greatly reduced by selecting an appropriate ratio of the amplification factors, and thus, an appropriate distance between the center of the optical spot and the boundary of the sub-photosensors. A ratio of 2 to 4 has found to be suitable for practical use. Accordingly, the ratio of the area of the sub-photosensors occupied by the optical spot is selected to be between 2 and 4 for the "in focus" state.

Although a photosensor having two sub-photosensors has been discussed, by employing a photosensor array having four sub-photosensors in a quadrant matrix, in accordance with a second embodiment of the present invention, one optical system can perform the functions of generating focus error signals, tracking error signals, and read signals to reproduce stored information. In addition, by employing four sub-photosensors arranged in a quadrant matrix, the total optical system for the optical storage apparatus may be simplified, resulting in a cost reduction, as well as an improvement in the quality and reliability of the apparatus.

These, together with other objects, features and advantages of the present invention will apparent as more fully described and claimed, with reference to the accompanying drawings, wherein like reference numerals refer to like parts.

DESCRIPTION OF THE PREFERRED EMBODIMENTS

Figure 1:
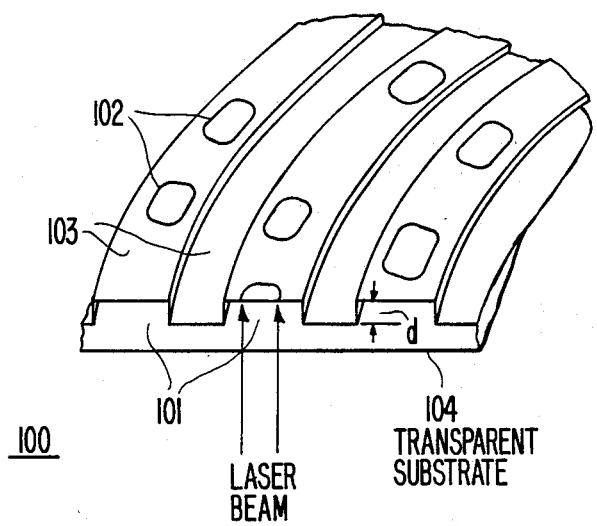
FIG. 1 is partial perspective view of the structure of an optical disk relevant to all of the embodiments of the present invention.

FIG. 1 is a partial perspective view of an optical disk which, for simplicity, will be used in conjunction with the description of all of the embodiments of the present invention. The disk 100 comprises a transparent substrate 104 having guiding tracks, or pregrooves 101, which may be formed as concentric tracks or as a spiral. The tracks have a depth d of $\frac{1}{8}$ λ, where λ is the wavelength of the laser employed in the optical storage apparatus. The disk 100 has pits 102 formed on the tracks 101, the pits 102 having a reflectivity which is 30% to 50% lower than that of the other portions 103 of the disk surface. Information signals are read from the disk by scanning the pits 102 with a laser beam having a diameter of approximately 1 μm, and detecting the intensity of the reflected laser beam which varies in accordance with the presence or absence of pits at the point of reflection.

Figure 2:
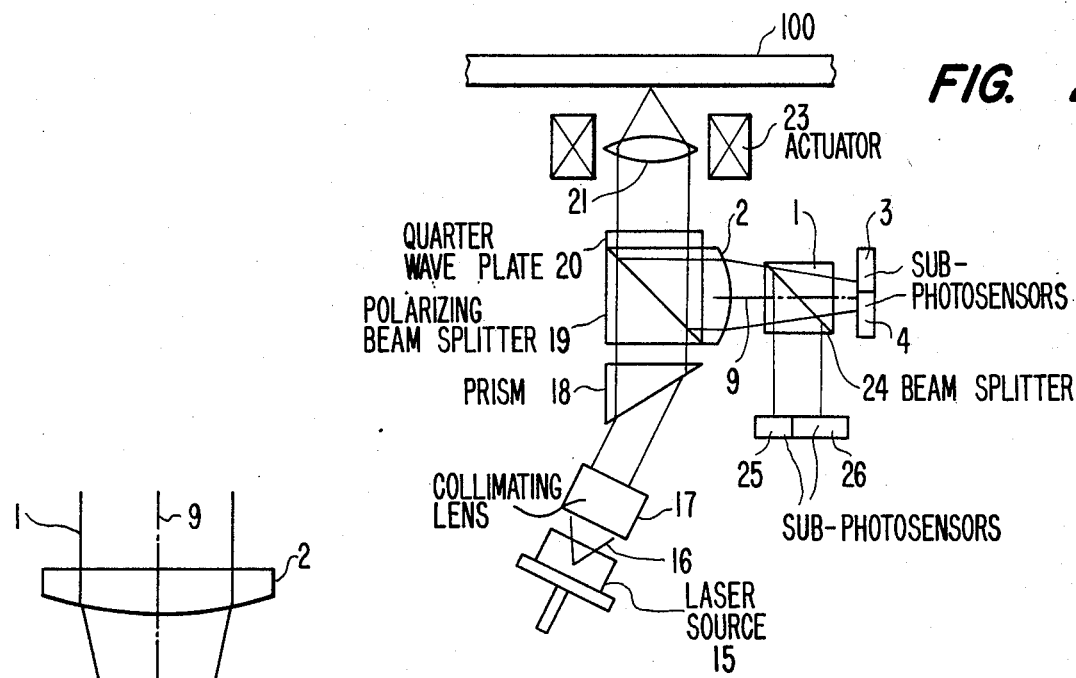
FIG. 2 is a partial block diagram of an optical storage apparatus of the first embodiment of the present invention.

FIG. 2 is a partial block diagram of an optical storage apparatus in accordance with the first embodiment of the present invention. In this optical storage apparatus, a laser flux 16 emitted from a laser source 15 is collimated by a collimating lens 17 to form a laser beam having a circular cross section. The laser beam then passes through a prism 18, a polarizing beam splitter 19, and a quarter wave plate 20, prior to being focused on the surface of an optical disk 100 by an objective lens 21. The objective lens 21 is moved by an actuator 23 having electromagnetic coils to focus the laser beam on the surface of the disk 100 and to transfer the center of the laser beam onto tracks 101 (FIG. 1). The reflected laser beam passes back through the objective lens 21 and the quarter wave plate 20 which rotates the polarizing plane of the laser beam by 90°. Then, the laser beam is reflected by the polarizing beam splitter 19 and condensed by condenser lens 2. After passing through condenser lens 2, the laser beam is separated into two beams by a beam splitter 24; one of the separated beams is incident on a photosensor comprising sub-photosensors 3 and 4 for generating focusing error signals, and the other separated beam is incident on a photosensor comprising sub-photosensors 25 and 26 for generating tracking error signals. The information stored on a disk may be read by detecting the total current of the photosensor for generating focusing error signals or the photosensor for generating tracking error signals.

The first embodiment of the present invention generates focusing error signals without the use of cylindrical lenses or an optical mask. Focusing systems which do not utilize cylindrical lenses or optical masks have been disclosed in Japanese Unexamined Patent Applications 59-139009 - M. Hanakawa, published Aug. 9, 1984 --, and 59-186142 -- K. Ikeda, published Oct. 22, 1984.

Japanese Unexamined Patent Applications Nos. 59-193009 and 59-186142 both relate to focusing systems in which the optical spot on a photosensor always has a circular shape and in which the diameter of the optical spot varies depending upon the focusing state, namely the "in focus" and "out of focus" states, of the laser beam. The photosensors in these focusing systems are separated into two electrically isolated sub-photosensor elements having different areas. The reflected beam incident on the photosensor has equal areas incident on each of the sub-photosensors when the laser beam incident on the optical disk is in the in-focus state. As a result, the photosensitive currents output by the sub-photosensors are equal when the laser beam is "in-focus". When the laser beam is "out-of-focus", the area of the optical spot incident on each of the sub-photosensors is unequal, and thus, focus error signals can be generated in accordance with the difference of the currents output by the sub-photosensors. Although such optical systems are simple, and the number of optical elements is small in comparison with the conventional optical systems, the alignment of the photosensor requires an extremely high three-dimensional accuracy, and the sensitivity of the photosensor is limited by its geometrical configuration. Importantly, such optical systems are applicable only to the generation of focusing error signals and cannot generate tracking error signals.

On the other hand, the focusing system of the present invention requires less dimensional accuracy for the alignment of the photosensor, and is simultaneously applicable to the generation of focusing and tracking error signals.

Figure 3:
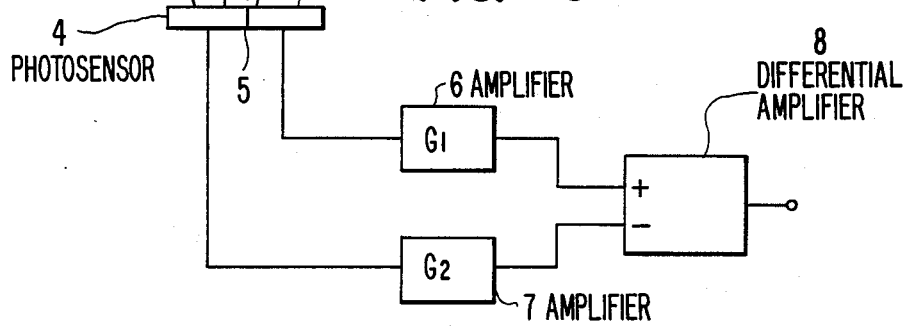
FIG. 3 is a block diagram of an optical system of the first embodiment of the present invention.

FIG. 3 is a block diagram of a focusing system of the first embodiment of the present invention, and FIG. 4 (a) is a diagram for explaining the relation between the size of the optical spot formed on the surface of the photosensor and the focus state of the laser beam. In particular, lines b, c and d in FIG. 4(a) represent planes bisecting a reflected laser beam at points having different cross-sectional areas; line c corresponds to the "in-focus" state and lines b and d to "out-of-focus" states. FIGS. 4(b)–(d) are plan views which illustrate the size of the optical spot formed on photosensors 3 and 4 by a reflected beam at different positions corresponding to lines b, c and d in FIG. 4(a), respectively. It is noted that the reflected laser beam is not focused on the surface of the photosensor when the displacement of the original laser beam is focused on the surface of the optical disk 100 but is instead focused behind photosensors 3 and 4 (see FIG. 3).

As shown in FIG. 3, photosensors 3 and 4 are adjacent to and electrically isolated from each other, and may be disposed on an insulating substrate (not shown). The optical axis 9 of the reflected laser beam 1, indicated by a dashed line, and the boundary 5, between photosensors 3 and 4 are separated from each other by a predetermined distance D. Photosensors 3 and 4 are also disposed so that the optical spot formed by the reflected laser beam moves in a direction parallel to the boundary line 5 when the original laser beam undergoes a radial displacement on the surface of the disk 100 (FIG. 2). This relation between the displacement of the optical spot and the original laser beam on the disk 100 is necessary to protect the focusing operation from disturbances caused by off-tracking, i.e., a radial displacement of the laser beam.

Figure 4A:
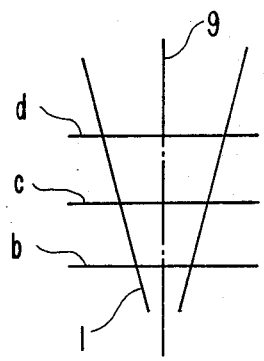
FIG. 4(a) is a schematic diagram for explaining the focusing system of the first embodiment.
Figure 4B:
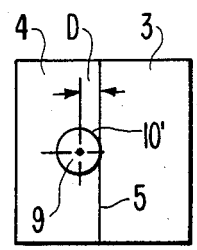
FIGS. 4(b)–(d) are plan views of optical spots reflected formed by laser beams on the surface of a photosensor, for describing the variation of the optical spot for various focusing states.
Figure 4C:
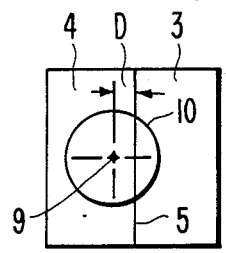
Figure 4D:
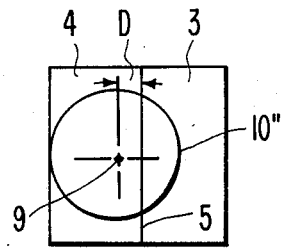

If the "in-focus" state is indicated by line (c) in FIG. 4(a) and circular spot 10 in FIG. 4(c), the displacement D between the boundary line 5 and the optical axis 9 of optical spot 10 results in a difference in the area of the reflected laser beam incident on the surface of photosensors 3 and 4. Therefore, in the "in-focus" state, the photoelectric currents generated by photosensors 3 and 4 are different; in particular, the photo current generated by photosensor 4 is greater than the current generated by photosensor 3.

The currents output by photosensors 3 and 4 are amplified by respective ones of amplifiers 6 and 7 having adjustable amplification factors $G_1$ and $G_2$, respectively. In the "in-focus" state, the amplification factors $G_{1f}$ and $G_{2f}$ are adjusted so that the amplified output currents of amplifiers 6 and 7 are equal. That is $G_{1f}$ is larger than $G_{2f}$ so that the currents output by amplifiers 6 and 7 are supplied to a differential amplifier 8, and, in the "in-focus" state, the output of differential amplifier 8 is zero.

The determination of the amplification factors $G_{1f}$ and $G_{2f}$ may be made by electrically adjusting the amplifiers 6 and 7—no positional adjustment of the optical system is necessary. Accordingly, the adjustment in the focusing system of the present invention is much easier than the adjustment of the conventional systems described above. The ease of adjusting the focusing system of the present invention is one of its important advantages.

The "out-of-focus" states are shown by lines (b) and (d) in FIG. 4(a) and circular spots 10' and 10" in the corresponding plan views of FIGS. 4(b) and (d). When the original laser beam is focused at a point between the objective lens 21 and optical disk 100, the optical spot of the reflected laser beam formed on the photosensor is shown optical spot 10' in FIG. 4(b). In this case, although the total current output by photosensors 3 and 4 remains fairly constant because the total energy of the reflected laser beam incident on the photosensor remains the same, most of the current is output by photosensor 4. Thus, the differential amplifier outputs a signal having a specific current and a polarity. When the original laser beam passing through objective lens 21 is focused at a point beyond the surface of optical disk 100, spot 10" is formed on the photosensor, as shown in FIG. 4 (d). As the size of the optical spot formed on the photosensors 3 and 4 increases, the output current of photosensor 3, which is amplified by the amplification factor $G_{1f}$, produces an output from amplifier 6 which is much higher than the amplified output current of photosensor 4 (output by amplifier 7), even though the apparent area of the optical spot on photosensor 3 is smaller than the area of the optical spot on photosensor 4. Thus, the output current of differential amplifier 8 has a specific current and a polarity which is inverted with respect to the polarity of the signal output when the size of the optical spot decreases.

Figure 5:
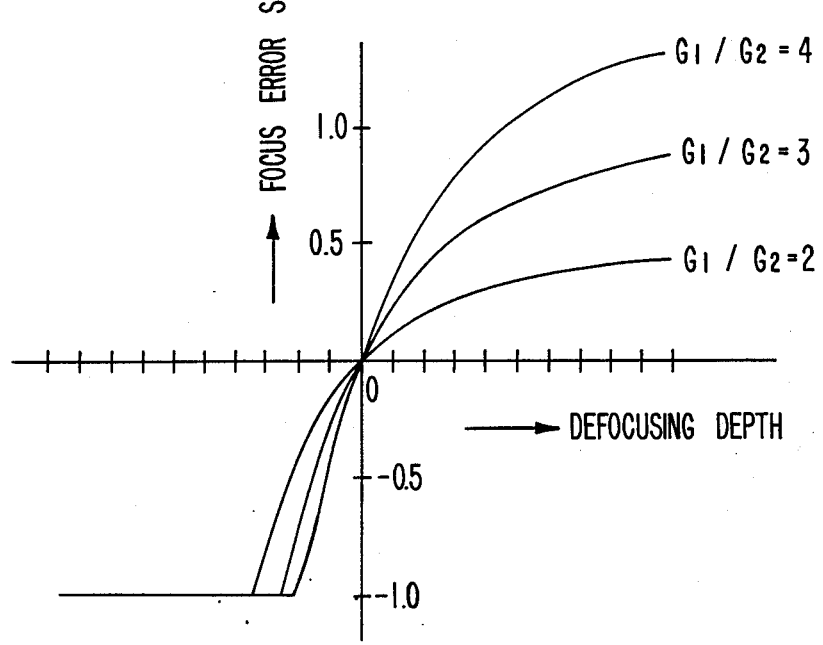
FIG. 5 is a graph of an empirical relationship between a defocusing depth and the value of a focusing error signal.

The focusing error signal generated by differential amplifier 8 indicates a defocusing depth by the amplitude of its current and a defocusing direction by its polarity. FIG. 5 is a graph showing experimental results for the relation between the defocusing depth in $\mu$m, represented along the abscissa, and the focusing error signal current, represent along the ordinate. The ratio of the selected amplification factors $R=G_{1f}/G_{2f}$, (hereinafter referred to as a gain ratio and signified by $R=G_1/G_2$) is the parameter shown by the curves. The slope of the curves increases as the gain ratio R increases; therefore, a higher gain ratio provides a higher sensitivity of the error signals. In other words, if the predetermined displacement D is larger, the resulting error signals are more sensitive to a change in the size of the optical spot formed on the photosensors 3 and 4. The horizontal line shown in the third quadrant of the graph of FIG. 5 indicates that the entire optical spot is incident only on photosensor 4 after the radius of the optical dot is less than the predetermined distance D, and the current output by differential amplifier 8 is constant. The tendency of the curves toward horizontal in the first quadrant indicates that the area of the optical spot exceeds the areas of photosensors 3 and 4 as the defocusing depth reaches a certain value.

It will be apparent to those skilled in the art that the focusing system of the first embodiment of the present invention is also applicable to optical disks which do not have tracks, or pregrooves, i.e., flat disks.

Figure 6:
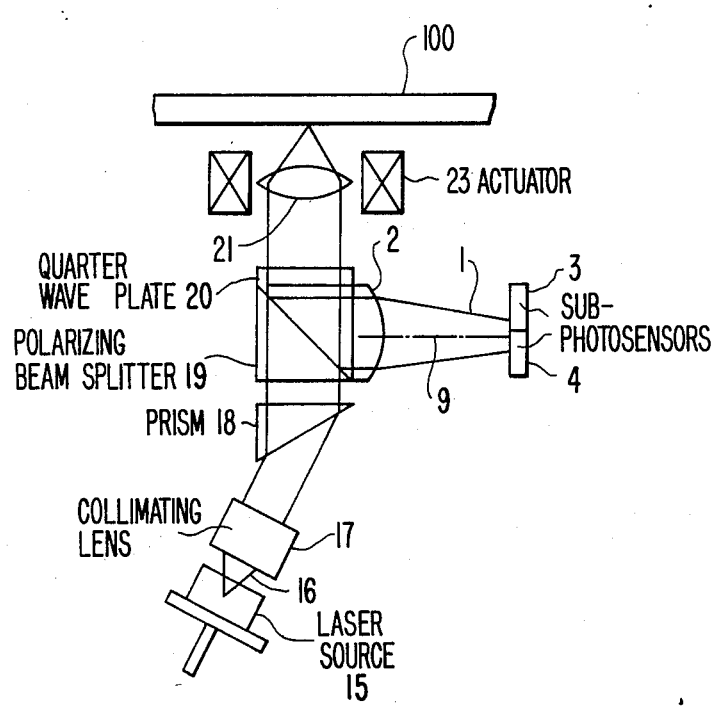
FIG. 6 is a partial block diagram of an optical storage apparatus of a second embodiment of the present invention.
Figure 7:
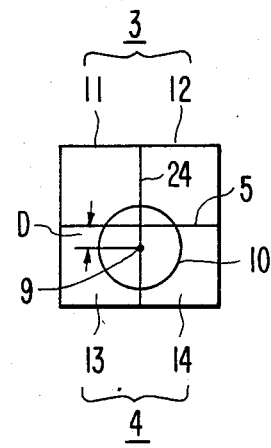
FIG. 7 is a schematic plan view of an optical spot of a laser beam incident on a photosensor of the second embodiment.

A second embodiment of the present invention will be described with reference to the block diagram of FIG. 6. The second embodiment of the optical storage apparatus of the present invention is similar to the optical storage apparatus shown in FIG. 2, with the exception that the polarizing beam splitter 24 and photosensors 25 and 26 are removed. Instead, photosensors 3 and 4 comprise sub-photosensors 11 and 12, and 13 and 14, respectively. Sub-photosensors 11-14 are disposed in a quadrant matrix, as shown in the plan view of FIG. 7. The purpose of providing two sub-photosensors in place of each of photo-sensors 3 and 4 is to allow the generation of both focusing and tracking error signals from the combination of the output currents of sub-photosensors 11-14. The sub-photosensors 11-14 are electrically isolated from each other, and the boundary 24 between sub-photosensors 11 and 13 and sub-photosensors 12 and 14 is perpendicular to the boundary 5 between photosensor 3, comprising sub-photosensors 11 and 12, and photosensor 4, comprising sub-photosensors 13 and 14. The photosensor array is oriented so that the center of the optical spot will fall on the boundary 24 when the original laser beam is centered on a track of the optical disk 100. As in the first embodiment of the present invention, the optical axis 9 of the optical spot of the reflected laser beam is displaced from the boundary 5 by a predetermined distance D, and the photosensors 11-14 are arranged so that the optical spot 10 moves in a direction parallel to boundary 5 when the original laser beam is moved in a radial direction of the optical disk 100. The output currents of the pairs of the photosensors located on either side of boundary 24 are balanced when the laser beam is "on track", so that "off tracking" of the original laser beam will cause an imbalance in the sum of the currents output by the pairs of photosensors located on opposite sides of boundary 24.

Figure 8:
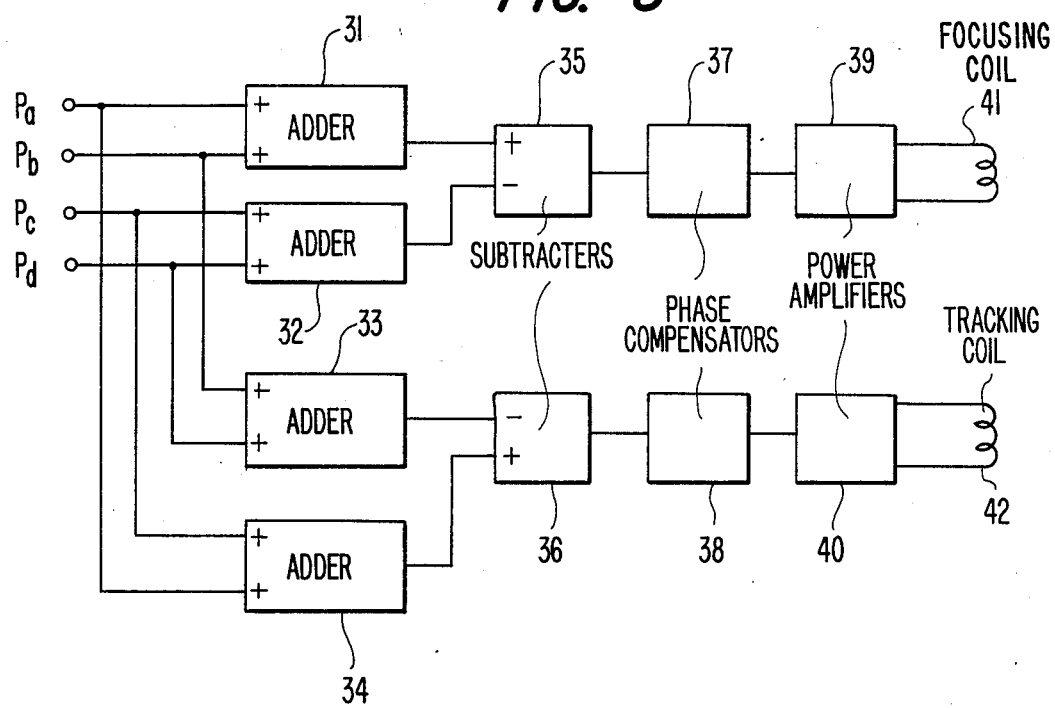
FIG. 8 is a block diagram of a circuit for use with the second embodiment of the present invention to process focus error signals and tracking error signals.

Focusing and tracking errors signals, and a read signal are generated from the outputs of sub-photosensors 11-14 by an operation circuit, shown in FIG. 8, the output currents of sub-photosensors 11-14 being represented by $P_a$, $P_b$, $P_c$ and $P_d$, respectively. Output currents $P_a$ and $P_b$ are supplied to adder 31 which generates an output signal representing the output current of photosensor 3. Output currents $P_c$ and $P_d$ are supplied to adder 32 which generates an output signal representing the output current of photosensor 4. Further, adder 31 and 32 includes amplifiers for amplifying the output currents of photosensors 3 and 4 by amplification factors $G_1$ and $G_2$, respectively, and the amplified output signals are utilized for focusing control in the same manner as in the first embodiment. Specifically, a focusing error signal F is given by the following equation:

$$F = G_1(P_a + P_b) - G_2(P_c + P_d) \quad (1)$$

The amplification factors $G_1$ and $G_2$ are selected such that F is zero when the beam is focused on the surface of the optical disk 100. Thus, subtractor 35 functions in the same manner as differential amplifier 8 (FIG. 3), and the relationship between the defocusing depth and focusing error signal current F is similar to that of the first embodiment, as shown by the graph in FIG. 5. The output current F generated by subtractor 35 is supplied to a phase compensator 37 and a power amplifier 39, and then to focusing coil 41 of the objective lens actuator 23.

A tracking error signal is generated in the following manner. As previously described, when the laser beam is off-tracking, there is an imbalance in the sum of the output currents $P_a$ and $P_c$ of sub-photosensors 11 and 13 and the sum of the output currents $P_b$ and $P_d$ of sub-photosensor 12 and 14. The sum of output currents $P_a$ and $P_c$ and the sum of the output currents $P_b$ and $P_d$ are provided by adders 34 and 33, respectively. The difference of both sums is detected by a subtractor 36 which generates a tracking error signal T which is supplied to a phase compensator 38 and a power amplifier 42, and subsequently to a tracking coil 42 in the objective lens actuator 23. The tracking error signal T is given by the following equation:

$$T = (P_a + P_c) - (P_b + P_d) \quad (2)$$

A readout signal S for reading the information stored on the optical disk 100 is obtained simply by summing the four output currents the relevant circuitry is not shown). The readout signal S is given by the following equation:

$$S = P_a + P_b + P_c + P_d \quad (3)$$

In accordance with the second embodiment, a focusing error signal, a tracking error signal, and a readout signal can be obtained by one photosensor array comprising four sub-photosensors. Moreover, the optical system is very simple and does not require a cylindrical lens or an optical mask. Further, the adjustment for defining a focusing state is electrically performed and accurate dimensional adjustments of the optical elements are not required.

Figure 9A:
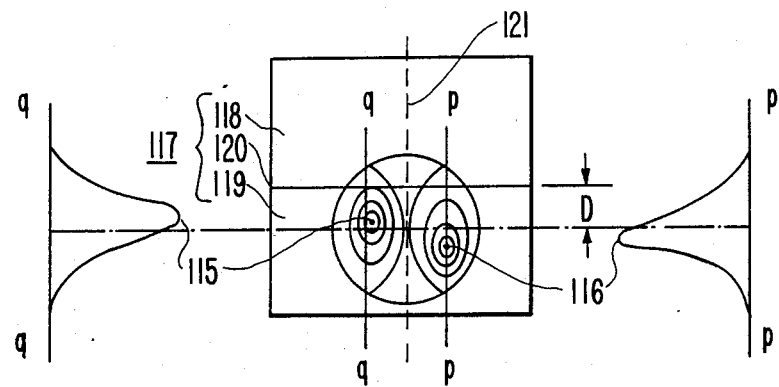
FIGS. 9(a)–(d) are diagrams for explaining external disturbances caused by the diffraction of a laser beam incident on pregrooves formed on an optical disk.
Figure 9B:
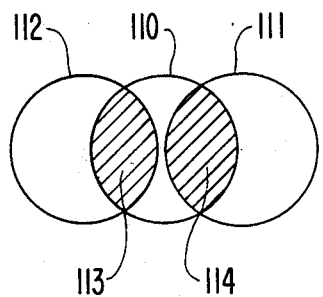

In addition, the focusing systems of the first and second embodiments have the advantage that the focusing error signals which are generated are not effected by so-called "exterior disturbances." Before discussing the specific advantage provided the first and second embodiments of the present invention in eliminating exterior disturbances, a brief explanation of "exterior disturbances," which are caused by optical diffraction due to the presence of tracks or pregrooves, will be described with reference to FIGS. 9(a)-(d). A laser beam reflected by a track, or pregroove, is partially diffracted by the disk surface. FIG. 9 (a) is a plan view showing the projection of an optical spot, corresponding to a laser beam which is partially diffracted at the disk surface, on the surface of a photosensor 117. Photosensor 117 comprises sub-photosensors 118 and 119 which are separated by a boundary 120. As shown schematically in FIG. 9(b), the optical spot comprises a spot 110 corresponding to a reflected laser beam of zero-order, i.e., a laser beam reflected directly by the surface of the disk, and spots 111 and 112 corresponding to diffracted laser beams of positive first-order and minus first-order, respectively. Hatched portions 113 and 114 are areas where a reflected laser beam of zero-order and diffracted laser beams of positive and negative first-order interfere with each other. In areas 113 and 114, where interference occurs, the optical intensity of the incident laser beam has a Gaussian distribution. The curves shown on both sides of FIG. 9(a) illustrate the Gaussian distributions of the optical intensity along lines p-p and q-q.

Figure 9C:
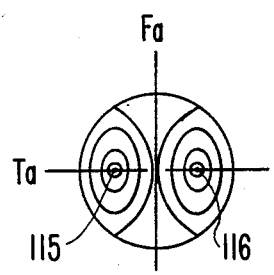

For an ideal optical system, the positions of peak points of the Gaussian distributions are expected to be symmetrically arranged with respect to an axis Fa bisecting the optical spot in the focusing direction and to fall on an axis Ta bisecting the optical spot in the tracing direction, as shown in FIG. 9(c). It is desirable to have the positions of the peak points of the Gaussian distributions arranged as shown in FIG. 9(c), and, for an ideal optical system, the value of the laser intensity at peak points 115 and 116 will be equal when the laser beam is on track. If the laser beam is off track, then the peak values are different; specifically, the output current generated by one of the areas 113 and 114 increases and the other output current decreases depending on the direction of off-tracking of the laser beam, e.g., toward the center of the disk or toward the outer edge of the disk. Thus, tracking error signals are generated by detecting the difference between currents generated by portions 113 and 114. As previously described, this method is referred to as a "push-pull" method.

Figure 9D:
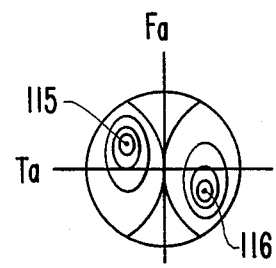

In practice, however, the various elements of an optical system often have optical defects, such as imperfect flatness of the surfaces of a mirror, prism, polarized beam splitter, quarter wave plate, etc., or small misalignments of the optical elements which may occur during the assembly process. The accumulated minor defects, however small the individual defects may be, results in a deviation of the peak points 115 and 116 to opposite sides of axis Ta. The deviation of the peak points 115 and 116 leads to an imbalance in the optical intensity distribution with respect to axis Fa, as shown in FIG. 9(d).

If it is assumed that photosensor 117 is arranged so that the boundary 120 is displaced from axis Ta of the optical spot by a predetermined distance D, then the output currents of sub-photosensors 118 and 119 are affected by the above-described unbalanced distribution of the optical intensity of the laser beam in relation with the distance D. To understand this effect, the case where D equals zero will be discussed. As shown in FIG. 9(a), even if D=0 peak point 115 falls on sub-photosensor 118 and peak point 116 falls on sub-photosensor 119. The difference in the output currents from sub-photosensors 118 and 119 is greatly affected by increases and decreases of the optical intensity at peak points 115 and 116. Thus, a focusing error signal is affected by a tracking error signal. Such an effect on the focusing error signal is referred to as "exterior disturbance" and is signified by δ in accordance with theoretical equation $$\delta = Ce^{-kD^2} \tag{4}$$

wherein C and k are constants. Therefore, the exterior disturbance $\delta$ can be reduced by increasing the displacement D of the beam spot. By increasing the displacement D, the beam spot is shifted so that both peak points of 115 and 116 of the Gaussian distribution fall on one of the sub-photosensors. This is equivalent to using a higher gain ratio $R=G_1/G_2$, with a value of R between 2 and 4 being most appropriate, as previously discussed.

Figure 10:
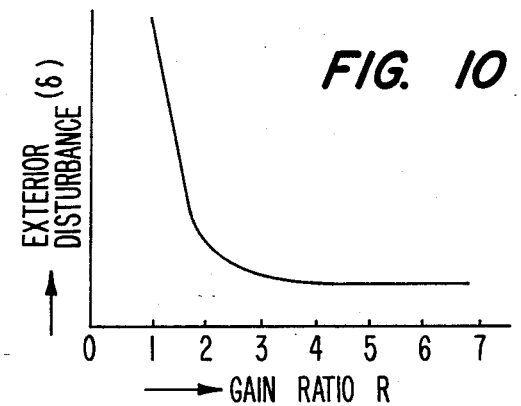
FIG. 10 is a graph of the empirical relationship between gain ratio and external disturbance.

FIG. 10 is a graph illustrating the relationship between the gain ratio R and the exterior disturbance $\delta$. As shown in FIG. 10, gain ratios higher than approximately 2 provide a fairly low external disturbance $\delta$. It is noted that excessively high gain ratios R are not practical because the boundary 120 (FIG. 9(a)) between photosensors 118 and 119 must be positioned extremely close to the edge of the optical spot, creating a difficult dimensional adjustment with respect to the location of the optical spot on the photosensors. The displacement of the optical axis of the optical beam incident on a pair of photosensors with respect to the boundary of the photosensors, in accordance with the present invention, therefore, eliminates the adverse effects of exterior disturbance.

In the third, fourth, fifth and sixth embodiments of the present invention, the apparatus described with respect to the second embodiment (FIG. 6) is used in combination with various masking means or their equivalents to partially limit or mask the laser beam which is incident on the photosensor. The masking means serves to provide a more sensitive focusing error signal.

Figure 11:
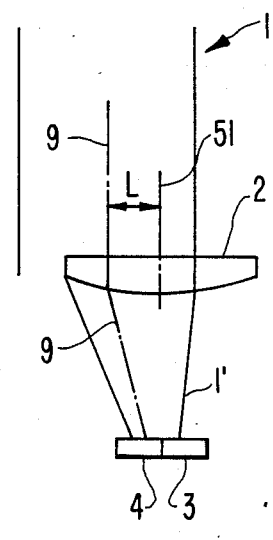
FIG. 11 is a partial schematic diagram of an optical system of a third embodiment of the present invention, illustrating the relation between a condenser lens and a laser beam incident thereon.
Figure 12:
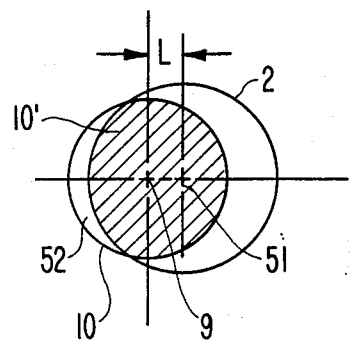
FIG. 12 is a plan view for describing the optical spot formed when the condenser lens the laser beam have the relation shown in FIG. 11.
Figure 13A:
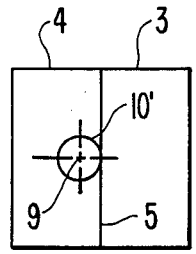
FIGS. 13(a)–(c) are plan views of a photosensor and optical spots for various focusing states of a laser beam generated by an optical storage apparatus of the third embodiment of the present invention.
Figure 13B:
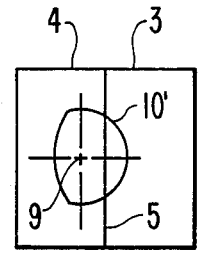
Figure 13C:
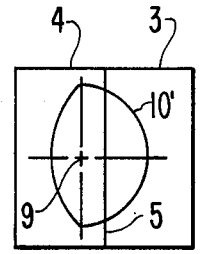

FIG. 11 is a diagram illustrating the third embodiment of the optical system of the present invention, and FIG. 12 is a plan view of an optical spot and a condenser lens in accordance with the third embodiment. FIG. 11 illustrates a reflected laser beam 1, having an optical axis 9, which is incident of a condenser lens 2 having an optical axis 51. A displacement by a distance L of the optical axis 9 of the laser beam 1 and the optical axis 51 of condenser lens 2 limits the amount of the laser beam 1 which is incident on photosensors 3 and 4. As shown in FIG. 12, only hatched portion 10' of the cross-section 10 of the laser beam is incident on lens 2. Thus, the optical spot formed by the laser beam incident on photosensors 3 and 4 is not circular; instead, the optical spot 10' is an eclipsed circle, as shown in FIGS. 13(b) and (c). When the optical axis 9 of laser beam 1 is offset from the optical axis 51 of condenser lens 2, and the optical axis 9 of the laser beam is displaced from the boundary 5 between photosensors 3 and 4 by a distance D, the method of determining a focus error signal is referred to as a "wax-wane" method. FIG. 13(b) illustrates the optical spot 10' when the original laser beam is in the in-focus state. FIGS. 13(a) and (c) show the optical spot 10' when the original laser beam is in the two out of focus states discussed previously.

Figure 14:
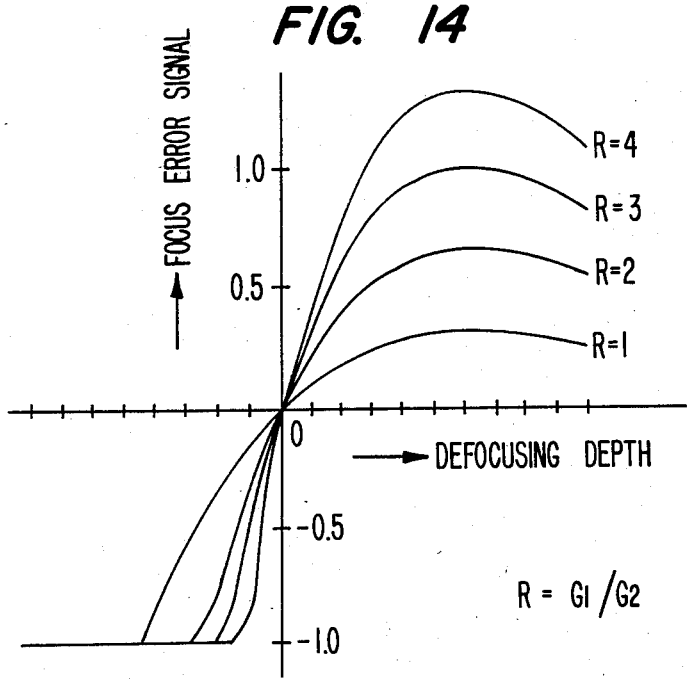
FIG. 14 is a graph of the empirical relationship between defocusing depth and the value of focusing error signals for the third embodiment of the present invention.

FIG. 14 is a graph illustrating experimental results for the relationship between the defocusing distance and the focusing error signal for the third embodiment, where the plotted parameter is the gain ratio R. In comparison with the results for the first embodiment of the present invention—shown in FIG. 5—in the region near the ordinate, for a given gain ratio R, the curves in FIG. 14 have a larger slope than the curves in FIG. 5, and the curves shown in FIG. 14 are more linear. Furthermore, the curves shown in FIG. 14 are more symmetrical with respect to the ordinate than the curves shown in FIG. 5.

The fourth, fifth and sixth embodiments are modifications of the third embodiment, the modifications relating to the manner in which the amount of the beam which is incident on the photosensors 3 and 4 is limited.

Figure 15A:
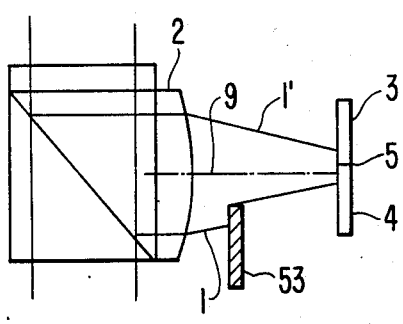
FIG. 15(a) is a partial block diagram of an optical system of a fourth embodiment of the present invention.
Figure 15B:
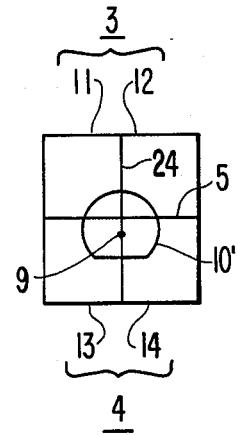
FIG. 15(b) is a plan view of an optical spot of a laser beam in the in-focus state incident on a photosensor in accordance with the fourth embodiment.

FIG. 15(a) is a diagram illustrating an optical system of a fourth embodiment. An optical mask 53 is provided between lens 2 and photosensor 4 to partially mask the laser beam incident on photosensor 4. The resultant optical spot 10' is shown in the plan view in FIG. 15(b).

Figure 16A:
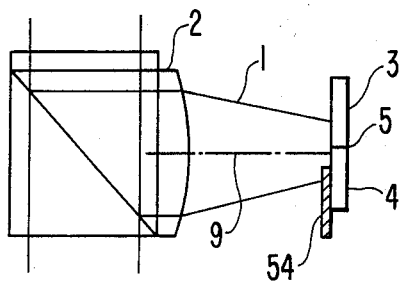
FIG. 16(a) is a partial block diagram of an optical system of a fifth embodiment of the present invention.
Figure 16B:
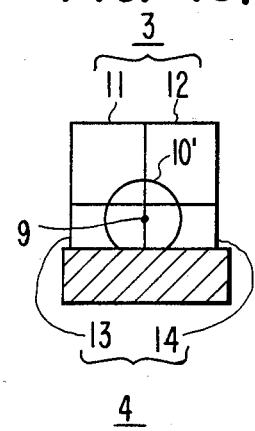
FIG. 16(b) is a plan view of an optical spot of the laser beam in the in-focus state incident on a photosensor in accordance with the fifth embodiment of the present invention.

FIG. 16(a) is a diagram illustrating the optical system of the fifth embodiment of the present invention. A mask 54 is placed directly on the surface of photosensor 4, and the resultant optical spot 10' is shown in the plan view of FIG. 16(b).

Figure 17A:
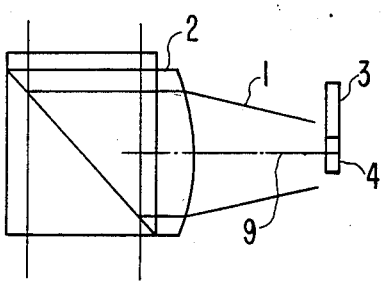
FIG. 17(a) is a partial block diagram of an optical system of a sixth embodiment of the present invention.
Figure 17B:
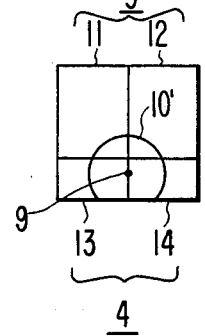
FIG. 17(b) is a plan view of an optical spot of a laser beam in the in-focus state incident on a photosensor in accordance with the fifth embodiment of the present invention.

FIG. 17(a) is a diagram illustrating the optical system of the sixth embodiment of the present invention. In the sixth embodiment, an optical mask is not used; instead, the size of photosensor 4 is reduced so that a portion of the laser beam is not incident on the surface of photosensor 4. Thus, the optical spot 10', shown in the plan view of FIG. 17(b) is the same as the optical spot for the fourth and fifth embodiments.

Further modifications of the masking means will be suggested to those skilled in the art; however, descriptions of other masking means will be presented omitted.

The present invention may be embodied in other specific forms without departing from the essential characteristics thereof. The disclosed embodiments are, therefore, to be considered, in all respects, as illustrative and not restrictive. The scope of the invention is indicated by the claims, rather than the foregoing description, and all modifications and changes which fall within the true spirit, scope, meaning and range of equivalency of the claims are, therefore, to be embraced by the claims.

What is claimed is:

1. An optical focusing servo system for generating a focusing error signal which is utilized to focus an optical beam on a reflective medium, comprising:

photosensor means for generating first and second photoelectric currents $I_1$ and $I_2$ in response to an optical beam incident thereon;

means for projecting at least a portion of the optical beam reflected by the reflective medium onto said photosensor means to cause said photosensor means to generate the first and second photoelectric currents, the first photoelectric current being different from the second photoelectric current when the optical beam is projected onto said photosensor means, the optical beam having a first optical axis, said projecting means including a condenser lens having a second optical axis which is offset from the first optical axis by a predetermined distance L;

first and second amplifying means having first and second amplification factors $G_1$ and $G_2$, respectively, for amplifying corresponding ones of the first and second photoelectric currents to generate first and second amplified output currents, the first and second amplification factors being selected so that the relation $I_1/I_2 = G_2/G_1$ is satisfied when the optical beam is in an in-focus state with respect to the reflective medium; and means, responsive to the first and second amplified output currents, for generating a focusing error signal corresponding to the difference between the first and second amplified output currents.

2. An optical focusing system according to claim 1, wherein;
said photosensor means comprises first and second sub-photosensors which are electrically isolated and arranged to define a common boundary; and
the first optical axis of the optical beam is substantially parallel to and offset, by a predetermined distance, from the common boundary of said first and second photosensors.

3. An optical focusing system according to claim 2, wherein the optical beam has a substantially circular cross section.

4. An optical focusing system according to claim 2, wherein the ratio of the first and second amplification factors satisfies the relation $2 \leq G_1/G_2 \leq 4$.

5. An optical focusing system according to claim 4, wherein the boundary between said first and second sub-photosensors is a substantially straight line.

6. An optical focusing system according to claim 1, wherein the ratio of the first and second amplification factors satisfies the relation $2 \leq G_1/G_2 \leq 4$.

7. An optical focusing and tracking system for generating focusing and tracking error signals for focusing and tracking an optical beam on a reflective medium, comprising;
photosensor means for generating first, second, third and fourth photoelectric currents $I_1$, $I_2$, $I_3$, and $I_4$ in response to an optical beam incident thereon;
means for projecting at least a portion of the optical beam reflected by the optical storage medium onto said photosensor means to cause said photosensor means to generate the first, second, third and fourth photoelectric currents, the sum of the first and second photoelectric currents being different from the sum of the third and fourth photoelectric currents when the optical beam is projected onto said photosensor means;
first and second amplifying means having first and second amplification factors $G_1$ and $G_2$, respectively, for amplifying the sum of the first and second photoelectric currents and the sum of the third and fourth photoelectric currents, respectively, and, in response thereto, generating corresponding first and second amplified output signals, the first and second amplification factors being selected so that the relations $(I_1+I_2)/(I_3+I_4)=G_2/G_1$ and $2 \leq G_1/G_2 \leq 4$ are satisfied when the optical beam is in an in-focus state with respect to the reflective medium;
means, responsive to the first and second amplified output signals, for generating focusing error signal corresponding to the distance between the first and second amplified output currents; and
means, responsive to the first, second, third and fourth photoelectric currents, for generating a tracking error signal corresponding to the difference between the sum of the first and third photoelectric currents and the sum of the second and fourth photoelectric currents.

8. An optical focusing and tracking system according to claim 7 wherein:
the optical beam has an optical axis;
said photosensor means comprises first, second, third and fourth sub-photosensors which are electrically isolated from each other and arranged in a quadrant matrix to define first and second boundaries therebetween, the first boundary being between said first and second sub-photosensors and said third and fourth sub-photosensors and disposed in a direction parallel to the direction which the reflected beam incident on said photosensor means moves when the optical beam moves radially on the optical recording disk, and said second boundary being between said first and third sub-photosensors and said second and fourth sub-photosensors; and
the optical axis of the optical beam is substantially parallel to and offset, by a predetermined distance, from the first boundary.

9. An optical focusing and tracking system according to claim 8, wherein said projecting means projects the optical beam so that the optical axis of the optical beam is incident on said third and fourth sub-photosensors.

10. An optical focusing system according to claim 7, wherein:
said projecting means comprises a condenser lens having an optical axis; and
the optical axis of the optical beam is offset from the optical axis of said condenser lens by a predetermined distance L.

11. An optical focusing and tracking system for generating focusing and tracking error signals for focusing and tracking an optical beam on a reflective medium, comprising:
photosensor means for generating first, second, third and fourth photoelectric currents $I_1$, $I_2$, $I_3$ and $I_4$ in response to an optical beam incident thereon;
a condenser lens for projecting at least a portion of the optical beam reflected by the optical storage medium onto said photosensor means, to cause said photosensor means to generate the first, second, third and fourth photoelectric currents, the sum of the first and second photoelectric currents being different from the sum of the third and fourth photoelectric currents when the optical beam is projected onto said photosensor means, the optical beam having a first optical axis, said condenser lens having a second optical axis which is offset from the first optical axis by a predetermined distance;
first and second amplifying means having first and second amplification factors $G_1$ and $G_2$, respectively, for amplifying the sum of the first and second photoelectric currents and the sum of the third and fourth photoelectric currents, respectively, and, in response thereto, generating corresponding first and second amplified output signals, the first and second amplification factors being selected so that the relation $(I_1+I_2)/(I_3+I_4)=G_2/G_1$ is satisfied when the optical beam is in an in-focus state with respect to the reflective medium;
means, responsive to the first and second amplified output signals, for generating a focusing error signal corresponding to the difference between the first and second amplified output currents; and
means, responsive to the first, second, third and fourth photoelectric currents, for generating a tracking error signal corresponding to the difference between the sum of the first and third photoelectric currents and the sum of the second and fourth photoelectric currents.

* * * * *